US012705496B2

(12) United States Patent
Huh

(10) Patent No.: US 12,705,496 B2
(45) Date of Patent: Aug. 11, 2026

(54) METHOD AND APPARATUS FOR AUTOMATICALLY GENERATING WELDING PROCEDURE SPECIFICATION USING MACHINE LEARNING ALGORITHMS

(71) Applicant: ONJ INC., Seoul (KR)

(72) Inventor: Sung Won Huh, Seoul (KR)

(73) Assignee: ONJ INC., Seoul (KR)

( * ) Notice: Subject to any disclaimer, the term of this patent is extended or adjusted under 35 U.S.C. 154(b) by 504 days.

(21) Appl. No.: 18/374,461

(22) Filed: Sep. 28, 2023

(65) Prior Publication Data

US 2024/0028906 A1 Jan. 25, 2024

Related U.S. Application Data

(63) Continuation of application No. PCT/KR2022/004374, filed on Mar. 29, 2022.

(30) Foreign Application Priority Data

Mar. 29, 2021 (KR) ........................ 10-2021-0040739
Jun. 21, 2021 (KR) ........................ 10-2021-0080282

(51) Int. Cl.
*G06N 3/09* (2023.01)

(52) U.S. Cl.
CPC ...................................... *G06N 3/09* (2023.01)

(58) Field of Classification Search
CPC ........................................................ G06N 3/09

(Continued)

(56) References Cited

U.S. PATENT DOCUMENTS

2003/0111451 A1* 6/2003 Blankenship ........ B23K 9/0953 219/130.5
2004/0140301 A1* 7/2004 Blankenship ........ B23K 9/0953 219/130.5

(Continued)

FOREIGN PATENT DOCUMENTS

JP 2020-527475 A 9/2020
KR 10-2005-0069473 A 7/2005

(Continued)

OTHER PUBLICATIONS

International Search Report issued in counterpart PCT/KR2022/004374, issued Jul. 7, 2022, pp. 1-3.

(Continued)

*Primary Examiner* — Teshome Hailu
(74) *Attorney, Agent, or Firm* — Dinsmore & Shohl LLP; Yongsok Choi, Esq.

(57) ABSTRACT

Provided are a method and apparatus for automatically generating a welding procedure specification (WPS) by using a machine learning algorithm. The method, performed by a processor of a WPS generating apparatus, of automatically generating a WPS by using a machine learning algorithm, includes collecting a WPS transmission request signal together with welding-related information including a welding material for a welding target and a thickness of the welding material, generating a WPS corresponding to the welding-related information by using a machine learning model pre-trained to generate the WPS by using the welding-related information, and transmitting a WPS response signal together with the generated WPS, in response to the WPS transmission request signal, wherein the machine learning model is a model trained through supervised learning using training data in which the welding-related infor- (Continued)

mation is an input and the WPS corresponding to the welding-related information is a label.

7 Claims, 11 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 2017/0032281 | A1* | 2/2017 | Hsu | G06Q 10/06 |
| 2022/0342392 | A1* | 10/2022 | Cummings | G06Q 10/06311 |

FOREIGN PATENT DOCUMENTS

| | | | |
|---|---|---|---|
| KR | 100938454 | B1 | 1/2010 |
| KR | 10-2011-0135652 | A | 12/2011 |
| KR | 10-1810114 | B1 | 12/2017 |
| KR | 10-2019-0048101 | A | 5/2019 |
| KR | 10-2020-0058105 | A | 5/2020 |
| KR | 1020200139962 | A | 12/2020 |

OTHER PUBLICATIONS

Murariu et al., KBS-Weld—cloud based platform for design of the welding procedure specification, Dec. 2019.

* cited by examiner

FIG. 2

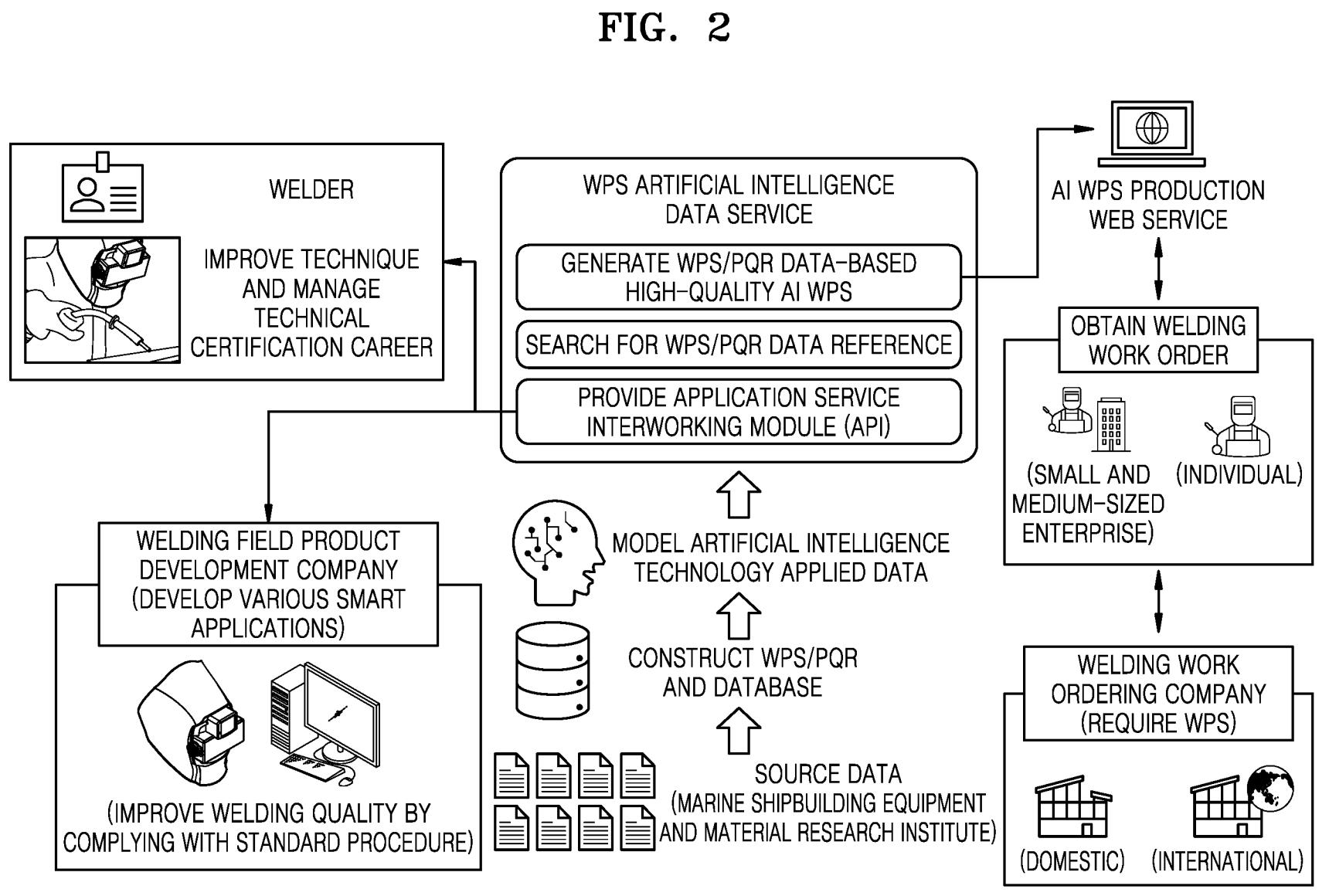

WPS ARTIFICIAL INTELLIGENCE DATA SERVICE

GENERATE WPS/PQR DATA-BASED HIGH-QUALITY AI WPS

SEARCH FOR WPS/PQR DATA REFERENCE

PROVIDE APPLICATION SERVICE INTERWORKING MODULE (API)

MODEL ARTIFICIAL INTELLIGENCE TECHNOLOGY APPLIED DATA

CONSTRUCT WPS/PQR AND DATABASE

SOURCE DATA (MARINE SHIPBUILDING EQUIPMENT AND MATERIAL RESEARCH INSTITUTE)

AI WPS PRODUCTION WEB SERVICE

OBTAIN WELDING WORK ORDER (SMALL AND MEDIUM-SIZED ENTERPRISE)

(INDIVIDUAL)

WELDING WORK ORDERING COMPANY (REQUIRE WPS)

(DOMESTIC)

(INTERNATIONAL)

WELDER

IMPROVE TECHNIQUE AND MANAGE TECHNICAL CERTIFICATION CAREER

WELDING FIELD PRODUCT DEVELOPMENT COMPANY (DEVELOP VARIOUS SMART APPLICATIONS)

(IMPROVE WELDING QUALITY BY COMPLYING WITH STANDARD PROCEDURE)

FIG. 8

| | WELDING PROCEDURE SPECIFICATION (WPS) | | | | |
|---|---|---|---|---|---|
| XXXX | XXXX XX XXXX | | | XXXX | XXXX |
| XXXXXX | XXXX XX XXXX | | | XXXX | XXXX |
| XXX | XXXX XX XXXX | | | XXXX | XXXX |
| XXX XXX | XXX | | | | |
| XXXX | | | | XXXX | |
| XXXX | XXXX XX XXXX | | | | |
| XXXXXX | XXXX XX XXXX | | | | |
| XXXX | | | | XXXX | |
| XXXX | X | X | X | XXXX | XXXX |
| XXXXXX | X | X | X | XXXX | XXXX |
| XXXX | XXXX XX XXXX | | | XXXX | XXXX |
| XXXXXX | XXXX XX XXXX | | | XXXX | XXXX |
| XXXX | X | X | X | XXXX | XXXX |
| XXXXXX | X | X | X | XXXX | XXXX |
| XXXX | XXXX XX XXXX | | | XXXX | XXXX |
| XXXXXX | XXXX XX XXXX | | | XXXX | XXXX |
| XXXX | X | X | X | XXXX | XXXX |
| XXXXXX | X | X | X | XXXX | XXXX |
| XXXX | XXXX XX XXXX | | | XXXX | XXXX |
| XXXXXX | XXXX XX XXXX | | | XXXX | XXXX |
| XXXX | | | | XXXX | |

| | | WELDING PROCEDURE SPECIFICATION (WPS) | | | | | | | |
|---|---|---|---|---|---|---|---|---|---|
| XXXX | | | | | | XXXX | | XX | |
| XXXXXX | | XXXX XX XXXX | | | | XXXX | | XXXX | |
| XXXX | | | | | | XXXX | | XX | |
| XXX XXX | | | | | | XXXX | | XX | |
| XXXX | | | | | | XXXX | | XX | |
| XXXXXX | | | | | | XXXX | | XX | |
| XXXXXX | | XXXX XX XXXX | | | | XXXXXX | | XX | |
| XXXXXX | | XXXX XX XXXX | | | | | | | |
| XXXX | | XXXX XX XXXX | | | | XXXX | | XX | |
| XXXXXX | | XXXX XX XXXX | | | | | | | |
| XXXX | | | | | | XXXX | | XX | |
| XXXXXX | | | | | | XXXX | | XX | |
| XXXXXX | | XXXX XX XXXX | | | | XXXXXX | | XX | |
| XXXXXX | | XXXX XX XXXX | | | | | | | |
| XXXX | | XXXX XX XXXX | | | | XXXX | | XX | |
| XXXXXX | | XXXX XX XXXX | | | | | | | |
| XXX | XXX | XXXX XX XXXX | | | | XXXX | XXXX | XXXX | XXXX |
| | | XXX | XXX | XXX | XXX | XXXX | XXXX | XXXX | XXXX |
| XXX | XXX | XXX | XXX | XXX | XXX | XXXX | XXXX | XXXX | XXXX |
| XXX | XXX | XXX | XXX | XXX | XXX | XXXX | XXXX | XXXX | XXXX |
| XXX | XXX | XXX | XXX | XXX | XXX | XXXX | XXXX | XXXX | XXXX |

METHOD AND APPARATUS FOR AUTOMATICALLY GENERATING WELDING PROCEDURE SPECIFICATION USING MACHINE LEARNING ALGORITHMS

CROSS-REFERENCE TO RELATED APPLICATIONS

This application is a continuation of International Application No. PCT/KR2022/004374 filed on Mar. 29, 2022, which claims to priority to Korean Patent Application No. 10-2021-0040739 filed on Mar. 29, 2021 and Korean Patent Application No. 10-2021-0080282 filed on Jun. 21, 2021, the entire contents of which are herein incorporated by reference.

TECHNICAL FIELD

The present disclosure relates to a method and apparatus for automatically generating a welding procedure specification (WPS) by using a machine learning algorithm.

BACKGROUND ART

Welding operations are widely used from various industries, such as shipbuilding, machinery, automobile, and construction, to manufacture, assembly, installation, and maintenance of products or facilities.

Welding operations require a lot of time and expenses and the reliability of results of the welding operations is also very important. If a state of a welding zone is not satisfactory, not only the quality of a structure deteriorate, but also a fatal detect occurs in a performance of a product.

Welding operations are performed according to a welding procedure specification (WPS) or a procedure qualification record (PQR), which presents in detail various welding conditions required for a specific welding part so that an appropriately trained welder may repeat the welding operations. The WPS and the PQR provide guide information to ensure that the welding operations are performed perfectly.

The aforementioned background technology is technical information possessed by the inventor for derivation of the present disclosure or acquired by the inventor during the derivation of the present disclosure, and is not necessarily prior art disclosed to the public before the application of the present disclosure.

PRIOR ART DOCUMENTS

Patent Documents (Patent Document 1) Korean Application Publication No. 10-2005-0069473 published on Jul. 5, 2005

SUMMARY

Technical Problem

An objective of the present disclosure is to establish a service for automatically generating a welding procedure specification (WPS) by using a machine learning algorithm and assisting a welding technology to be easily used through a web service. An objective of the present disclosure is to automatically generate a WPS by using a machine learning algorithm and improve the reliability of the WPS through inspection on the spot.

An objective of the present disclosure is to assist a welding technology to be easily used by recommending a WPS suitable to welding-related information from among WPSs established in a database.

Aspects of the present disclosure are not limited to those mentioned above, and other aspects and advantages of the present disclosure, which are not mentioned, will be understood from descriptions below and will become more apparent by embodiments of the present disclosure. In addition, the aspects and advantages of the present disclosure will be realized through means and combinations thereof in the claims.

Technical Solution

A method, performed by a processor of a welding procedure specification (WPS) generating apparatus, of automatically generating a WPS by using a machine learning algorithm, according to an embodiment of the present disclosure, includes collecting a WPS transmission request signal together with welding-related information including a welding material for a welding target and a thickness of the welding material, generating a WPS corresponding to the welding-related information by using a machine learning model pre-trained to generate the WPS by using the welding-related information, and transmitting a WPS response signal together with the generated WPS, in response to the WPS transmission request signal, wherein the machine learning model is a model trained through supervised learning using training data in which the welding-related information is an input and the WPS corresponding to the welding-related information is a label.

An apparatus for automatically generating a welding procedure specification (WPS) by using a machine learning algorithm, according to an embodiment of the present disclosure, includes a processor, and a memory operatively connected to the processor and storing at least one code performed by the processor, wherein the memory stores codes that cause, when executed through the processor, the processor to collect a WPS transmission request signal together with welding-related information including a welding material for a welding target and a thickness of the welding material, generate a WPS corresponding to the welding-related information by using a machine learning model pre-trained to generate the WPS by using the welding-related information, and transmitting a WPS response signal together with the generated WPS, in response to the WPS transmission request signal, wherein the machine learning model is a model trained through supervised learning using training data in which the welding-related information is an input and the WPS corresponding to the welding-related information is a label.

In addition, provided are another method for implementing the present disclosure, another system for implementing the present disclosure, and a computer-readable recording medium having stored therein a computer program for executing the method.

Other aspects, features, and advantages may become clear from the following drawings, the claims, and the detailed description of the present disclosure.

Advantageous Effects

According to the present disclosure, a service for automatically generating a welding procedure specification (WPS) by using a machine learning algorithm and assisting a welding technology to be easily used through a web service can be established.

Also, a WPS can be automatically generated by using a machine learning algorithm and the reliability of the WPS can be improved through inspection on the spot.

Also, a user can conveniently use a welding technology by recommending a WPS suitable to welding-related information from among WPSs established in a database.

The effects of the present disclosure are not limited to those mentioned above, and other effects that are not mentioned may be clearly understood by one of ordinary skill in the art from the scope of claims.

DESCRIPTION OF DRAWINGS

FIGS. 1 and 2 are diagrams illustrating a welding procedure specification (WPS) automatic generation environment based on a machine learning algorithm, including a WPS generating apparatus, a user terminal, welding protective equipment, a supervisor terminal, a welding device, and a network connecting thereof to each other, according to an embodiment.

FIG. 8 is a diagram for schematically describing a WPS generated by the WPS generating apparatus of FIG. 8.

DETAILED DESCRIPTION

Figure 1:
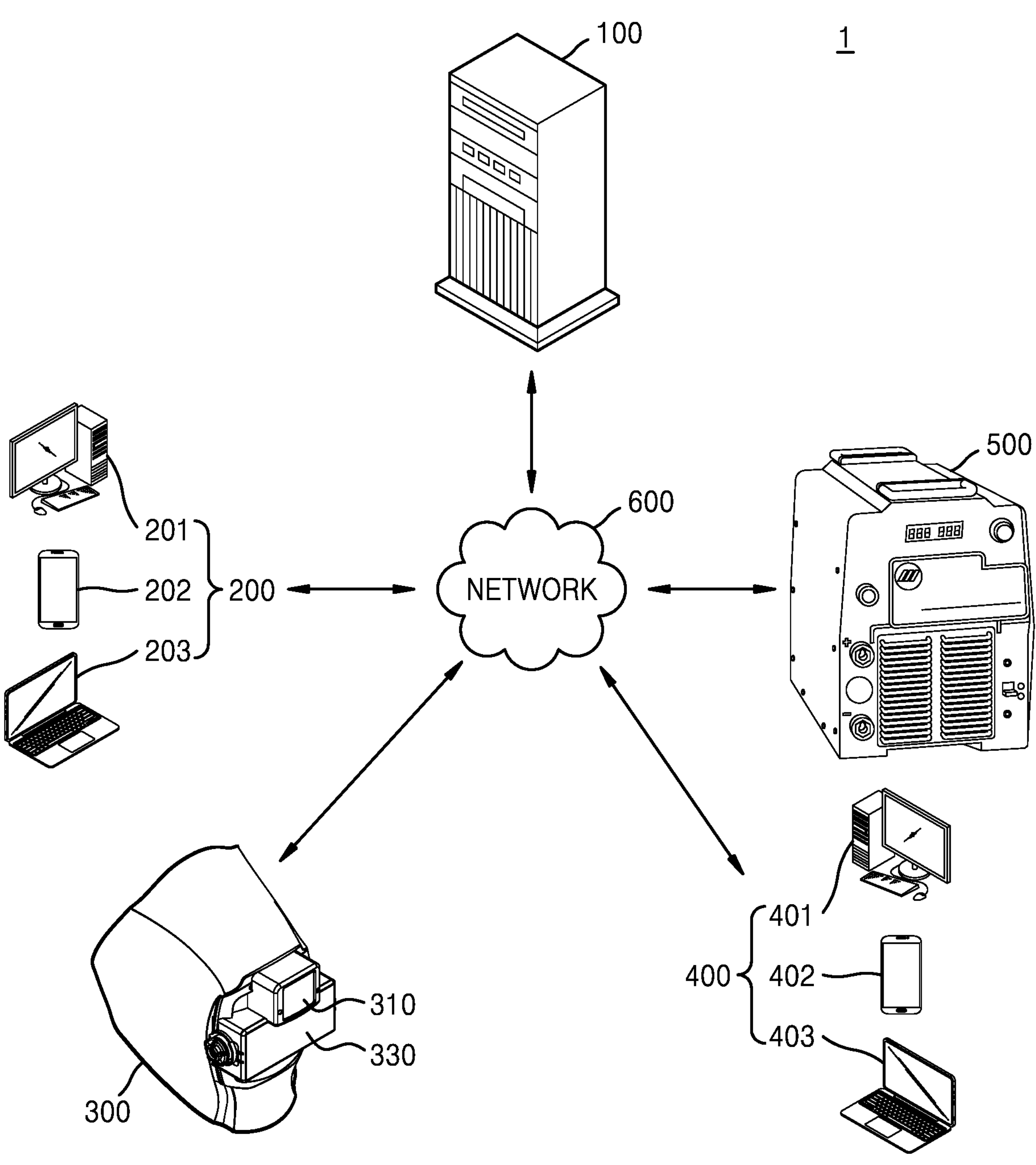

Advantages and features of the present disclosure and methods of accomplishing the same may be understood more readily by reference to the following detailed description of the embodiments and the accompanying drawings. However, it should be understood that the present disclosure is not limited to the embodiments presented below, but may be implemented in various different forms, and include all transformations, equivalents, and substitutes included in the spirit and scope of the present disclosure. The embodiments presented below are provided to complete the present disclosure and to fully inform one of ordinary skill in the art of the scope of the present disclosure. In the description of the present disclosure, certain detailed explanations of related art are omitted when it is deemed that they may unnecessarily obscure the essence of the present disclosure.

Also, the terms used in the present specification are only used to describe specific embodiments, and are not intended to limit the present disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. While such terms as "first", "second", etc., may be used to describe various components, such components are not limited to the above terms. The above terms are used only to distinguish one component from another.

In the specification, the term "unit" or "-or/er" may be a hardware component such as a processor or circuit and/or a software component that is executed by a hardware component such as a processor.

Hereinafter, one or more embodiments according to the present disclosure will be described in more detail with reference to the accompanying drawings. Those components that are the same or are in correspondence with each other are rendered the same reference numeral regardless of the figure number, and redundant explanations are omitted.

FIGS. 1 and 2 are diagrams illustrating a welding procedure specification (WPS) automatic generation environment based on a machine learning algorithm, according to an embodiment. Referring to FIGS. 1 and 2, a WPS automatic generation environment 1 based on a machine learning algorithm may include a WPS generating apparatus 100, a user terminal 200, welding protective equipment 300, a supervisor terminal 400, a welding device 500, and a network 600.

The WPS generating apparatus 100 may collect a WPS transmission request signal together with welding-related information including a welding material for a welding target and a thickness of the welding material, from the user terminal 200 and/or the welding protective equipment 300 and/or the welding device 500.

According to the present embodiment, the minimum welding-related information collected by the WPS generating apparatus 100 from the user terminal 200 and/or the welding protective equipment 300 and/or the welding device 500 may include a welding material (e.g., iron, copper, or the like) for at least two welding targets and a thickness of the welding material. In addition, the welding-related information may further include a welding process (type), a welding rod type, a preheat temperature, and a welding pose.

The welding-related information collected by the WPS generating apparatus 100 from the user terminal 200 and/or the welding protective equipment 300 and/or the welding device 500 may include one or more of text information, speech information, and image information.

When the welding-related information is the text information, an object that inputs text welding-related information may include the user terminal 200. When the user terminal 200 accesses a WPS generating application and/or a WPS generating site provided by the WPS generating apparatus 100, inputs the welding-related information in text, and selects a WPS transmission request, the welding-related information and the WPS transmission request signal may be transmitted to the WPS generating apparatus 100.

When the welding-related information is the speech information, an object that inputs speech welding-related information may include the user terminal 200 and/or the welding protective equipment 300 including a microphone (not shown). When the user terminal 200 accesses the WPS generating application and/or the WPS generating site provided by the WPS generating apparatus 100, inputs the welding-related information in a speech, and selects the WPS transmission request, the speech welding-related information and the WPS transmission request signal may be transmitted to the WPS generating apparatus 100. According to the present embodiment, the WPS generating apparatus 100 includes a speech recognition function, and thus, may collect the speech welding-related information in response to the WPS transmission request input by a user through the speech. According to a selective embodiment, the welding protective equipment 300 includes a communication unit (not shown) and the microphone, and thus, may access the WPS generating application and/or the WPS generating site provided by the WPS generating apparatus 100 and transmit the speech welding-related information and a speech WPS transmission request signal to the WPS generating apparatus 100.

When the welding-related information is the image information, an object that inputs image welding-related information may include the user terminal 200 and/or the welding protective equipment 300 including a microphone (not shown). When the user terminal 200 accesses the WPS generating application and/or the WPS generating site provided by the WPS generating apparatus 100, inputs an image obtained by photographing the welding-related information, and selects the WPS transmission request, the image welding-related information and the WPS transmission request signal may be transmitted to the WPS generating apparatus 100. According to the present embodiment, the WPS generating apparatus 100 includes an image recognition function, and thus, may collect the image welding-related information in response to the WPS transmission request input by the user through a gesture. According to a selective embodiment, the welding protective equipment 300 includes a communication unit (not shown) and a camera 310, and thus, may access the WPS generating application and/or the WPS generating site provided by the WPS generating apparatus 100 and transmit the image welding-related information and the WPS transmission request signal using the gesture to the WPS generating apparatus 100.

The WPS generating apparatus 100 may generate a WPS by applying, to artificial intelligence (AI), the welding-related information collected from the user terminal 200 and/or the welding protective equipment 300 and/or the welding device 500.

Here, AI is a field of computer engineering and information technology for studying a method enabling a computer to think, learn, and self-improve, which are done by human intelligence, wherein the computer may emulate intelligent behaviors of a human.

Also, AI does not exist by itself but is directly or indirectly associated with other fields of computer science. In particular, nowadays, attempts to introduce AI elements to various fields of information technology and use the same in problem-solving of the fields have been very actively made.

Machine learning is one field of AI and may include a field of study of providing, to a computer, capability to learn without an explicit program. In detail, machine learning may be a technology of studying and establishing a system for learning based on empirical data, performing prediction, and self-improving a performance, and an algorithm therefor. Algorithms of machine learning may establish a specific model to derive prediction or decision, based on input data, rather than performing strictly determined static program commands.

A machine learning method of an artificial neural network may include both unsupervised learning and supervised learning. Also, a deep learning technology that is a type of machine learning may perform learning down to a deep level in multi-stages, based on data. Deep learning may indicate a set of machine learning algorithms that extract core data from a plurality of pieces of data as stages increase.

The WPS generating apparatus 100 may generate the WPS corresponding to the welding-related information by using a machine learning model pre-trained to generate the WPS by using the welding-related information. Here, a machine learning model may be a model trained through supervised learning using training data in which the welding-related information is an input and the WPS corresponding to the welding-related information is a label.

The WPS generating apparatus 100 may train the machine learning model initially configured by using labeled training data, through supervised learning. Here, the initially configured machine learning model is an initial model designed to be configured as a model capable of generating the WPS, and parameter values are configured in arbitrary initial values.

The initial model is trained through the above-described training data such that the parameter values are optimized, and thus, may be completed as a WPS generating model capable of accurately generating the WPS.

The WPS generating apparatus 100 may transmit a WPS response signal together with the generated WPS to the user terminal 200 and/or the welding protective equipment 300 and/or the welding device 500, in response to the WPS transmission request signal.

Figure 4:
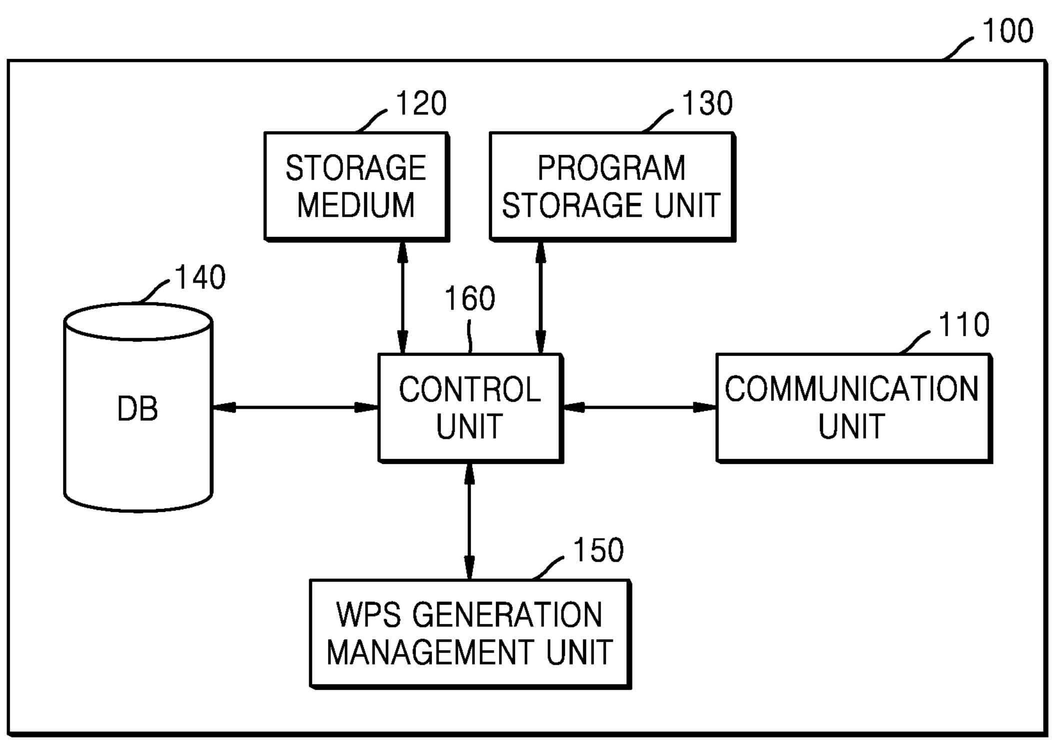

According to a selective embodiment, upon collecting the WPS transmission request signal together with the welding-related information, the WPS generating apparatus 100 may extract, as a recommended WPS, a suitable WPS from among WPSs established in a database 140 of FIG. 4 and transmit the WPS response signal together with the extracted recommended WPS. In other words, the WPS generating apparatus 100 may search for and recommend the suitable WPS corresponding to the welding-related information.

In the present embodiment, a WPS newly generated by the WPS generating apparatus 100 by using AI may be a preliminary WPS before completion, and the preliminary WPS may be transmitted to the supervisor terminal 400 and the welding device 500 and inspection on the preliminary WPS may be performed by receiving welding result monitoring information from the supervisor terminal 400.

The supervisor terminal 400 may generate the welding result monitoring information using the welding device 500, based on the preliminary WPS received from the WPS generating apparatus 100, and transmit the welding result monitoring information to the WPS generating apparatus 100. In the present embodiment, a supervisor may include a first supervisor and a second supervisor.

The first supervisor may be a subject who determines whether the welding protective equipment 300 and the welding device 500 satisfactorily perform welding according to content of the preliminary WPS and generates the welding result monitoring information. The first supervisor may generate, by using his/her terminal, the welding result monitoring information about whether the welding protective equipment 300 and the welding device 500 satisfactorily perform the welding according to the content of the preliminary WPS, and transmit the same to the WPS generating apparatus 100.

The second supervisor is, for example, a WPS certified supervisor and may be a subject who performs inspection on the preliminary WPS by receiving the welding result monitoring information and generates inspection result information for the preliminary WPS. Here, the inspection result information for the preliminary WPS may include information about determining approval of the preliminary WPS as a completed WPS or information about determining disapproval of the preliminary WPS as the completed WPS. The second supervisor may generate the inspection result information for the preliminary WPS, based on the welding result monitoring information by using his/her terminal, and transmit the same to the WPS generating apparatus 100.

Accordingly, in the present embodiment, the supervisor terminal 400 may include one or more of a terminal possessed by the first supervisor and a terminal possessed by the second supervisor.

The WPS generating apparatus 100 may determine approval or disapproval of the preliminary WPS as the completed WPS, by using the inspection result information for the preliminary WPS, received from the supervisor terminal 400 possessed by the second supervisor.

When the approval of the preliminary WPS as the completed WPS is determined, the WPS generating apparatus 100 may store the completed WPS. When the disapproval of the preliminary WPS as the completed WPS is determined, the WPS generating apparatus 100 may revise or update the preliminary WPS, based on the welding result monitoring information, perform inspection on the revised or updated preliminary WPS, and repeat revision and inspection until the approval as the completed WPS is determined.

According to the present embodiment, the WPS generating apparatus 100 may construct the database 140 of FIG. 4 by collecting a procedure qualification record (PQR) from the outside. When the WPS is generated to perform high-quality welding according to stipulated requirements, the WPS may be supported by the PQR. The PQR is generated to guarantee that a welding procedure used according to the WPS will produce the high-quality welding, and is a record of strictly tested welding. The PQR may include not only results of tests performed with respect to welding, but also variables or parameters recorded during the welding procedure during the welding. The variables or parameters may be related to, for example, a joint type, electrical characteristics, a base metal, a filler metal, a shielding type, preheat/interpass, and welding parameters (e.g., a current, a voltage, a moving speed, a wire feed speed, and an electrode diameter). Also, the performed tests may include, for example, a visual inspection, a tensile test, a bending test, a hardness test, a Charpy impact test, a macroetch test, a torque test, a detachment test, a nick break test, a radiographic test, and an ultrasonic test.

According to a selective embodiment, the WPS generating apparatus 100 may search the database 140 for one or more PQRs for WPS generation, based on the welding-related information collected from the user terminal 200 and/or the welding protective equipment 300 and/or the welding device 500. When one or more PQRs are found, the PQRs may be combined according to a WPS format to generate the WPS. However, when a PQR is not found, the WPS may be generated by using AI described above.

In the present embodiment, as shown in FIG. 2, the WPS generating apparatus 100 may generate the WPS through an AI technology, based on the database 140 of FIG. 4 constructed by collecting PQR source data and establish a service assisting a welding technology to be easily used through a web service.

In the present embodiment, the WPS generating apparatus 100 may establish a core service that may be developed into a platform associable with various WPS-based applications later.

In the present embodiment, the WPS generating apparatus 100 may apply a high-quality WPS automatically generated through construction of the database 140 of FIG. 4, AI algorithm development, web service development, and AI technology of an actual welding site, to be inspected on the spot.

The user terminal 200 may access the WPS generating application and/or WPS generating site provided by the WPS generating apparatus 100 and receive the above-described service related to WPS generation. In the present embodiment, the user may include a welding worker performing welding or a manager managing the welding workers.

The user terminal 200 may include a communication terminal capable of performing functions of a computing device (not shown), and may be a desktop computer 201, a smartphone 202, a tablet personal computer (PC), a notebook computer, a smart television (TV), a mobile phone, a personal digital assistant (PDA), a laptop computer 203, a media player, a micro-server, a global positioning system (GPS) device, an electronic book terminal, a digital broadcasting terminal, a navigation device, a kiosk, an MP3 player, a digital camera, a home appliance, or another mobile or non-mobile computing device, which is manipulated by the user, but is not limited thereto. Also, the user terminal 200 may include a wearable terminal, such as a watch, glasses, a hair band, and a ring, including a communication function and a data processing function. The user terminal 200 is not limited by the above-described details, and a terminal capable of web browsing may be unlimitedly employed.

The welding protective equipment 300 is adopted during welding to protect a welding worker and may be equipment that blocks a hazard that is generated from a welding work environment. The welding protective equipment 300 may be provided to protect and cover the face of the welding worker and formed of a material having predetermined strength, e.g., reinforced plastic, but the present embodiment is not limited thereto and any material resistant to a factor such as a spark that may occur during welding may be used.

In the present embodiment, the welding protective equipment 300 may include the camera 310 and a display unit 330, and although not illustrated, may further include a communication unit, a microphone, a sensor unit, and a processor controlling operations of the welding protective equipment 300.

The camera 310 may receive a control command from the processor and photograph a welding work site by changing settings, such as a shutter speed, an ISO speed, and gain, in response to the control command. In the present embodiment, the camera 310 may photograph the welding-related information.

The display unit 330 may provide, to the welding worker, a high-quality synthetic image. In detail, the display unit 330 may be realized in the form of goggle glasses including a display displaying a synthetic image obtained by combining images obtained through the camera 310 to the worker. In the present embodiment, the display unit 330 may enable the welding worker to check the WPS by displaying the WPS received from the WPS generating apparatus 100.

The display included in the display unit 330 may display the high-quality synthetic image such that the welding worker may visually check a surrounding environment (e.g., a shape of a pre-worked weld bead) in addition to a region adjacent to a welding light. Also, the display unit 330 may guide the welding worker with visual feedback (e.g., a welding direction) regarding welding progress.

The display included in the display unit 330 may be realized using various display technologies, such as a liquid crystal display (LCD), an organic light-emitting diode (OLED), a light-emitting diode (LED), a liquid crystal on silicon (LcoS), and digital light processing (DLP). Here, the display according to the present embodiment may be realized as a panel of an opaque material and the worker may not be directly exposed to a harmful light. However, the display is not necessarily limited thereto and the display may be provided as a transparent display.

The sensor unit may include a plurality of sensor modules configured to detect various types of information about the welding site and obtain welding information. Here, the welding information may include a welding temperature, a welding direction, a welding slope, a welding speed, and a space between a base material and a welding torch, with respect to a real-time welding work. In addition, the sensor unit may include an optical sensor module configured to detect light intensity within at least a welding work area. Also, the sensor unit may include an illuminance sensor and, in this case, the sensor unit may obtain information about welding light intensity of the welding site. The sensor unit may further include, in addition to the illuminance sensor, various types of sensors, such as a proximity sensor, a noise sensor (video sensor), an ultrasonic sensor, and a radio frequency (RF) sensor, and may detect various changes related to the welding work environment.

The communication unit may provide, in association with the network 600, a communication interface required to provide, in the form of packet data, transmission/reception signals between the WPS generating apparatus 100, the user terminal 200, the welding protective equipment 300, and the supervisor terminal 400.

The supervisor terminal 400 may generate welding result monitoring information, based on the WPS, by accessing the WPS generating application and/or the WPS generating site provided by the WPS generating apparatus 100 or according to a request of the WPS generating apparatus 100, and transmit the welding result monitoring information to the WPS generating apparatus 100. The supervisor terminal 400 may be a desktop computer 401, a smartphone 402, a laptop computer 403, or other computing device.

The welding device 500 may perform welding on a welding target by using electricity. When the welding target and a welding rod are electrically connected to each other, heat is generated between the welding target and the welding rod, and thus, the welding rod is melted and a portion of the melted welding rod may be deposited on the welding target, thereby forming weld beads. The welding target and the welding rod may be connected to the welding device 500 through a wire. The welding device 500 may provide power of different voltages and currents. The welding device 500 includes an adjusting unit to adjust a voltage and a current, and the user may perform a welding work by adjusting the voltage and the current by using the adjusting unit.

In the present embodiment, the welding device 500 may further include a communication unit (not shown) to communicate with the WPS generating apparatus 100. The communication unit may provide, in association with the network 600, a communication interface required to provide, in the form of packet data, transmission/reception signals between the WPS generating apparatus 100, the user terminal 200, the welding protective equipment 300, and the supervisor terminal 400.

The network 600 may connect the WPS generating apparatus 100, the user terminal 200, the welding protective equipment 300, the supervisor terminal 400, and the welding device 500 to each other. Examples of the network 600 include wired networks, such as a local area network (LAN), a wide area network (WAN), a metropolitan area network (MAN), and an integrated service digital network (ISDN), and wireless networks, such as wireless LAN (WLAN), code-division multiple access (CDMA), and satellite communication, but the scope of the present disclosure is not limited thereto. Also, the network 600 may transmit/receive information by using short-range communication and/or long-range communication. The short-range communication may include Bluetooth, radio frequency identification (RFID), infrared data association (IrDA), ultra-wideband (UWB), ZigBee, or wireless fidelity (Wi-Fi) technology, and the long-range communication may include a code division multiple access (CDMA), frequency division multiple access (FDMA), time division multiple access (TDMA), orthogonal frequency division multiple access (OFDMA), or single carrier frequency division multiple access (SC-FDMA) technology.

The network 600 may include a connection of network elements, such as a hub, a bridge, a router, or a switch. The network 600 may include one or more connected networks including a public network, such as the Internet, and a private network, such as a safe corporate private network, for example, a multi-network environment. An access to the network 600 may be provided through one or more wired or wireless access networks. In addition, the network 600 may support an Internet of things (IoT) network, wherein information is exchanged between distributed elements, such as things, to be processed, and/or 5th generation (5G) communication.

Figure 3:
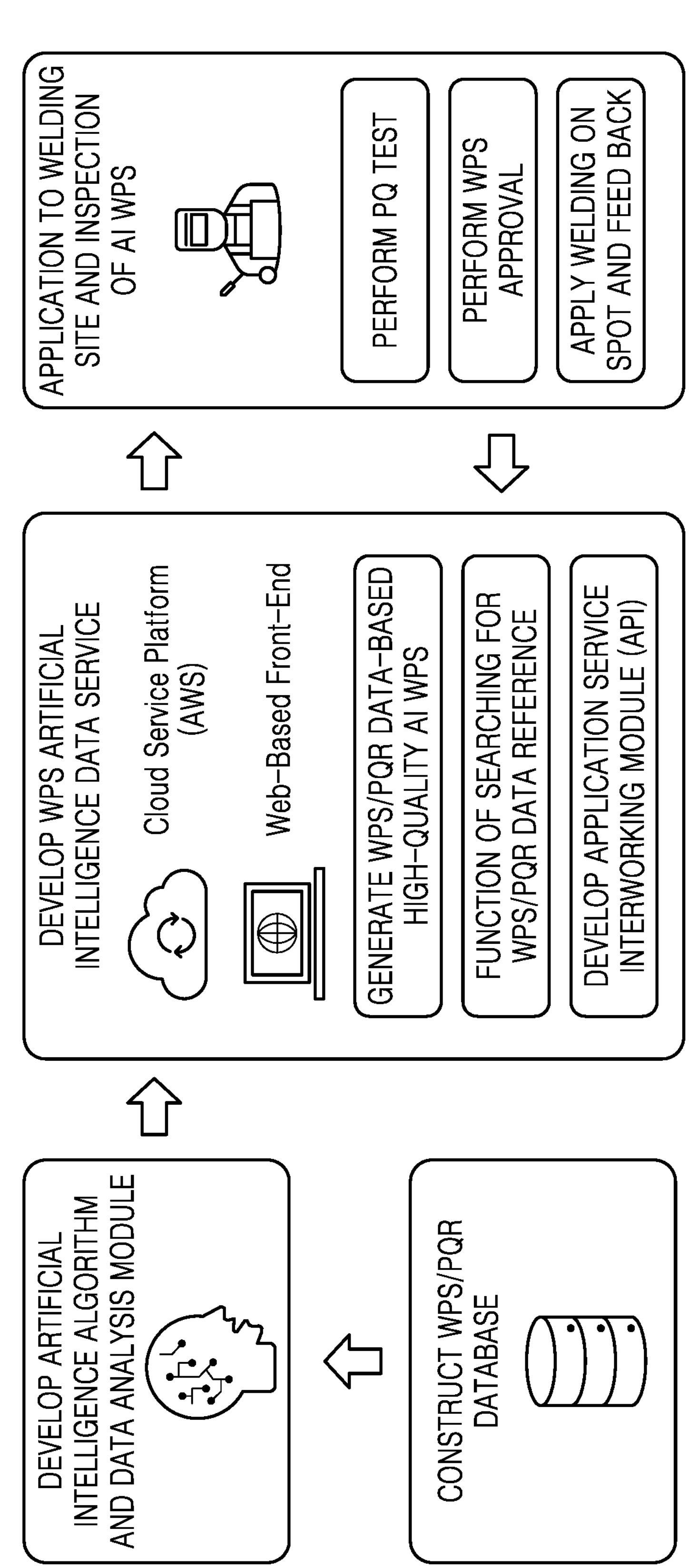
FIGS. 3 and 4 are diagrams for schematically describing a configuration of a WPS generating apparatus, according to an embodiment.

FIGS. 3 and 4 are diagrams for schematically describing a configuration of a WPS generating apparatus, according to an embodiment. In the descriptions below, descriptions about details overlapping those of FIGS. 1 and 2 are omitted. Referring to FIGS. 3 and 4, the WPS generating apparatus 100 may include a communication unit 110, a storage medium 120, a program storage unit 130, the database 140, a WPS generation management unit 150, and a control unit 160.

The communication unit 110 may provide, in association with the network 600, a communication interface required to provide, in the form of packet data, transmission/reception signals between the WPS generating apparatus 100, the user terminal 200, the welding protective equipment 300, the supervisor terminal 400, and the welding device 500. In addition, the communication unit 110 may receive the WPS transmission request signal from the user terminal 200 and/or the welding protective equipment 300 and/or the welding device 500, and transmit the WPS generated by the WPS generation management unit 150 to the user terminal 200 and/or the welding protective equipment 300 and/or the welding device 500. In addition, the communication unit 110 may transmit the WPS generated by using the AI technology together with an inspection request signal to the supervisor terminal 400 and/or the welding device 500, and receive the welding result monitoring information generated by the supervisor terminal 400. Here, a communication network denotes a medium connecting the WPS generating apparatus 100, the user terminal 200, the welding protective equipment 300, the supervisor terminal 400, and the welding device 500, and may include a path providing an access path for the user terminal 200, the welding protective equipment 300, and/or the supervisor terminal 400 to access the WPS generating apparatus 100 and transmit/receive information. Also, the communication unit 110 may be a device including hardware and software required to transmit/receive a signal, such as a control signal or a data signal, through a wired/wireless connection with another network device.

The storage medium 120 performs a function of temporarily or permanently storing data processed by the control unit 160. Here, the storage medium 120 may include a magnetic storage medium or a flash storage medium, but the scope of the present disclosure is not limited thereto.

The program storage unit 130 stores control software for performing a task of constructing a database by collecting the PQRs from the outside, a task of collecting the welding-related information and the WPS transmission request signal from the user terminal 200 and/or the welding protective equipment 300 and/or the welding device 500, a task of performing one or more of text processing, speech processing, and image processing on the collected welding-related information, a task of generating the WPS by applying the welding-related information to the machine learning model, a task of transmitting the WPS response signal together with the WPS to the user terminal 200 and/or the welding protective equipment 300 and/or the welding device 500, a task of searching the database 140 for one or more PQRs for WPS generation, based on the welding-related information collected from the user terminal 200 and/or the welding protective equipment 300 and/or the welding device 500, a task of, when the one or more PQRs are found, generating the WPS by combining the same according to a WPS format, a task of transmitting the generated WPS to the supervisor terminal 400 and the welding device 500, as the preliminary WPS, a task of receiving the welding result monitoring information using the welding device, based on the preliminary WPS, from the supervisor terminal 400, a task of determining approval or disapproval of the preliminary WPS as the completed WPS, and a task of revising or updating the preliminary WPS.

The database 140 may include a management database storing information and an algorithm for the WPS generation. Various types of PQRs collected from the outside may be established in the management database. Also, the management database may store an algorithm of extracting a keyword from the text welding-related information, a speech recognition algorithm of performing speech recognition processing on the speech welding-related information to convert the speech welding-related information into text, and an image recognition algorithm of performing image recognition processing on the image welding-related information to convert the image welding-related information into text. Also, the management database may store an AI algorithm for the WPS generation. Also, the management database may store the WPS format for generating the WPS by combining the PQRs. The management database may store the WPS (preliminary WPS) generated by using the AI algorithm and store the completed WPS that has been approved and the WPS (preliminary WPS) that has been disapproved.

The database 140 may include a user database storing information about a user (the welding worker or manager) who is to receive a WPS generation service, and information about a supervisor who is to inspect the WPS (preliminary WPS). Here, the information about the user and supervisor may include basic information, such as a name, affiliation, personal data, gender, age, contact number, email address, address, and image of a subject, information about authentication (login) of the subject, such as an identification (ID) (or an email address) and a password, and access-related information, such as an access country, an access location, information about a device used for access, and an accessed network environment. Also, the user database may store unique information of the welding device 500 and welding protective equipment 300 that is to receive the WPS generation service, for example, a serial number, a manufacturing company, and a manufactured year.

In the present embodiment, the user database or the management database may store information and/or category history provided to the user or supervisor who accessed the WPS generating application or the WPS generating site, information about an environment setting set by the user or the supervisor, information about a resource use amount used by the user or the supervisor, information about charging and payment corresponding to the resource use amount of the user or the supervisor.

The WPS generation management unit 150 may construct the database by collecting the PQRs from the outside. The WPS generation management unit 150 may collect the welding-related information and the WPS transmission request signal from the user terminal 200 and/or the welding protective equipment 300 and/or the welding device 500. The WPS generation management unit 150 may perform one or more of text processing, speech processing, and image processing on the collected welding-related information. The WPS generation management unit 150 may generate the WPS by applying the welding-related information to the machine learning model. The WPS generation management unit 150 may transmit the WPS response signal together with the WPS to the user terminal 200 and/or the welding protective equipment 300 and/or the welding device 500. The WPS generation management unit 150 may search the database 140 for one or more PQRs for the WPS generation, based on the welding-related information collected from the user terminal 200 and/or the welding protective equipment 300 and/or the welding device 500. When one or more PQRs are found, the WPS generation management unit 150 may generate the WPS by combining the one or more PQRs according to the WPS format. The WPS generation management unit 150 may transmit the generated WPS to the supervisor terminal 400 and the welding device 500, as the preliminary WPS. The WPS generation management unit 150 may receive, from the supervisor terminal 400, the welding result monitoring information using the welding device, based on the preliminary WPS. The WPS generation management unit 150 may determine approval or disapproval of the preliminary WPS as the completed WPS and revise or update the preliminary WPS.

The control unit 160 is a type of a central processing unit, and may control all operations of the WPS generating apparatus 100 by driving the control software mounted on the program storage unit 130. The control unit 160 may include any type of devices capable of processing data, such as a processor. Here, the processor may denote a hardware-embedded data processing device including a physically structured circuit to perform a function represented by an instruction or a code included in a program. Examples of the data processing device embedded in hardware may include processing devices, such as a microprocessor, a central processing unit (CPU), a processor core, a multiprocessor, an application-specific integrated circuit (ASIC), and a field programmable gate array (FPGA), but the scope of the present disclosure is not limited thereto.

Figure 5:
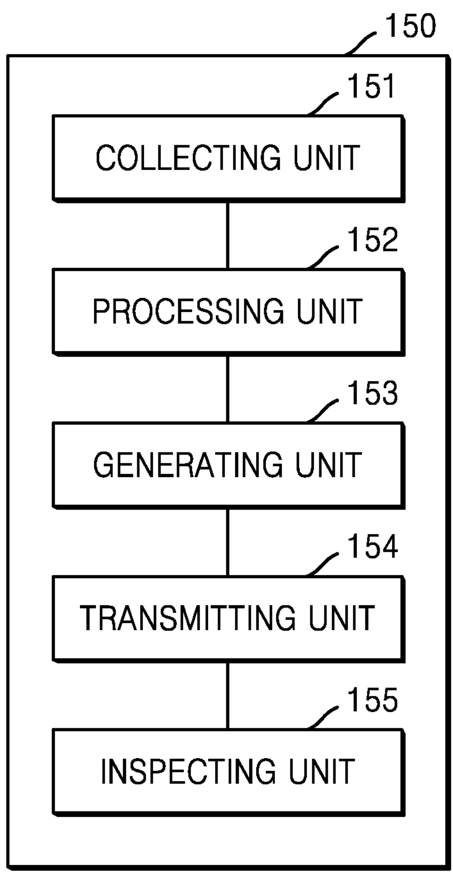
FIG. 5 is a block diagram for schematically describing a configuration of a WPS generation management unit according to an embodiment among the WPS generating apparatus of FIG. 3.

FIG. 5 is a block diagram for schematically describing a configuration of a WPS generation management unit according to an embodiment among the WPS generating apparatus of FIG. 3. Hereinafter, descriptions about details that overlap those of FIGS. 1 to 5 are omitted. Referring to FIG. 5, the WPS generation management unit 150 may include a collecting unit 151, a processing unit 152, a generating unit 153, a transmitting unit 154, and an inspecting unit 155.

The collecting unit 151 may collect the WPS transmission request signal together with the welding-related information including the welding material for the welding target and the thickness of the welding material, from the user terminal 200 and/or the welding protective equipment 300 and/or the welding device 500. According to the present embodiment, the collecting unit 151 may collect one or more of the text welding-related information, the speech welding-related information, and the image welding-related information.

The processing unit 152 may convert the speech welding-related information and the image welding-related information collected by the collecting unit 151 into the text welding-related information.

The processing unit 152 may generate the text welding-related information by performing speech recognition on the collected speech welding-related information. The processing unit 152 may load a speech recognition algorithm stored in the database 140 to convert the speech welding-related information into the text welding-related information.

For the speech recognition, the processing unit 152 may include an utterance recognition unit (not shown) and the utterance recognition unit may include an acoustic model and a language model. For example, the acoustic model may include information related to vocalization and the language model may include unit phoneme information and information about a combination of unit phoneme information. The utterance recognition unit may convert the speech welding-related information into the text welding-related information by using the information related to the vocalization and the unit phoneme information. Information about the acoustic model and the language model may be stored in the database 140.

The processing unit 152 may generate the text welding-related information by performing image recognition in the collected image welding-related information. The processing unit 152 may load the image recognition algorithm stored in the database 140 to convert the image welding-related information into the text welding-related information.

According to the present embodiment, the processing unit 152 may extract a type of the welding target from the image welding-related information and convert the same into text. The database 140 stores an image of the welding target and a reference image regarding the type thereof, and thus the collected image welding-related information may be compared with the reference image stored in the database 140 to determine the type of the welding target and convert the same into text.

Also, the processing unit 152 may calculate the thickness of the welding target from the image welding-related information and convert the same into text. The thickness of the welding target may be calculated by using resolution information of a camera, a region of the welding target set by the user (or the welding worker) when the image welding-related information is transmitted, and reference coordinate information, and converted into text.

The generating unit 153 may generate the WPS by applying a machine learning algorithm, such as deep learning, to the text welding-related information. According to the present embodiment, the generator 1753 may generate the WPS corresponding to the international welding standards (e.g., ASME, AWS, ISO, or KS).

A deep learning technology that is a type of machine learning may perform learning down to a deep level in multi-stages, based on data. Deep learning may indicate a set of machine learning algorithms that extract core data from a plurality of pieces of data as stages increase.

A deep learning structure may include artificial neural network (ANN) and for example, the deep learning structure may include a deep neural network (DNN), such as a convolutional neural network (CNN), a recurrent neural network (RNN), or a deep belief network (DBN). The deep learning structure according to the present embodiment may use well-known various structures. For example, the deep learning structure according to the present disclosure may include CNN, RNN, or DBN. RNN is widely used for natural language processing or the like, and may configure an ANN structure by stacking up layers every moment in a structure effective for time-series data processing that changes over time. DBN may include a deep learning structure configured by stacking up restricted Boltzmann machine (RBM) that is a deep learning technique in multiple layers. When there is a certain number of layers by repeating RBM learning, DBN having the corresponding number of layers may be configured. CNN may include a model emulating a human brain function, which is generated based on the assumption that when a human recognizes an object, basic features of the object are extracted and then complex calculations are performed inside the brain to recognize the object, based on results thereof.

The generating unit 153 may include an ANN, for example, a DNN such as CNN, RNN, or DBN, and may learn DNN. A machine learning method of ANN may include both unsupervised learning and supervised learning.

In the present embodiment, the generating unit 153 may generate the WPS corresponding to the text welding-related information by using a machine learning model pre-trained to generate the WPS by using the text welding-related information. In the present embodiment, the machine learning model may be a model trained through supervised learning using training data in which the text welding-related information is an input and the WPS corresponding to the text welding-related information is a label.

Also, the generating unit 153 may repeatedly learn information according to a real-time service scenario, and divide and model samples closely distributed as a high-frequency type and remaining samples as a low-frequency type through statistical analysis. Also, a hybrid model may be applied to overcome a weakness of low failure data. In this regard, a decision tree may be applied to high-frequency type prediction in which regularity is strong, and DNN or support vector machine (SVM) having strong resilience may be applied to the low-frequency (rare) type.

The transmitting unit 154 may transmit the WPS response signal together with the generated WPS to the user terminal 200 and/or the welding protective equipment 300 and/or the welding device 500, in response to the WPS transmission request signal.

The inspecting unit 155 may inspect the WPS generated by the generating unit 153. Here, the WPS generated by the generating unit 153 may be the preliminary WPS before completion. The inspecting unit 155 may transmit the preliminary WPS to the welding device 500 and the supervisor terminal 400 possessed by the first supervisor and the second supervisor, and receive a result of inspecting the preliminary WPS, which is generated based on the welding result monitoring information, from the supervisor terminal 400 possessed by the welding result monitoring information.

The inspecting unit 155 may transmit the preliminary WPS to the supervisor terminal 400 possessed by the first supervisor and receive the welding result monitoring information from the supervisor terminal 400 possessed by the first supervisor. The inspecting unit 155 may transmit the welding result monitoring information and the preliminary WPS to the supervisor terminal 400 possessed by the second supervisor. The supervisor terminal 400 possessed by the second supervisor may generate the inspection result information for the preliminary WPS, based on the welding result monitoring information. The inspecting unit 155 may receive the inspection result information for the preliminary WPS from the supervisor terminal 400 possessed by the second supervisor. The inspecting unit 155 may determine approval or disapproval of the preliminary WPS as the completed WPS, by using the inspection result information for the preliminary WPS, received from the supervisor terminal 400 possessed by the second supervisor. When the approval of the preliminary WPS as the completed WPS is determined, the inspecting unit 155 may store the completed WPS. When the disapproval of the preliminary WPS as the completed WPS is determined, the inspecting unit 155 may revise or update the preliminary WPS, based on the welding result monitoring information, perform inspection on the revised or updated preliminary WPS, and repeat revision and inspection until the approval as the completed WPS is determined.

Figure 6:
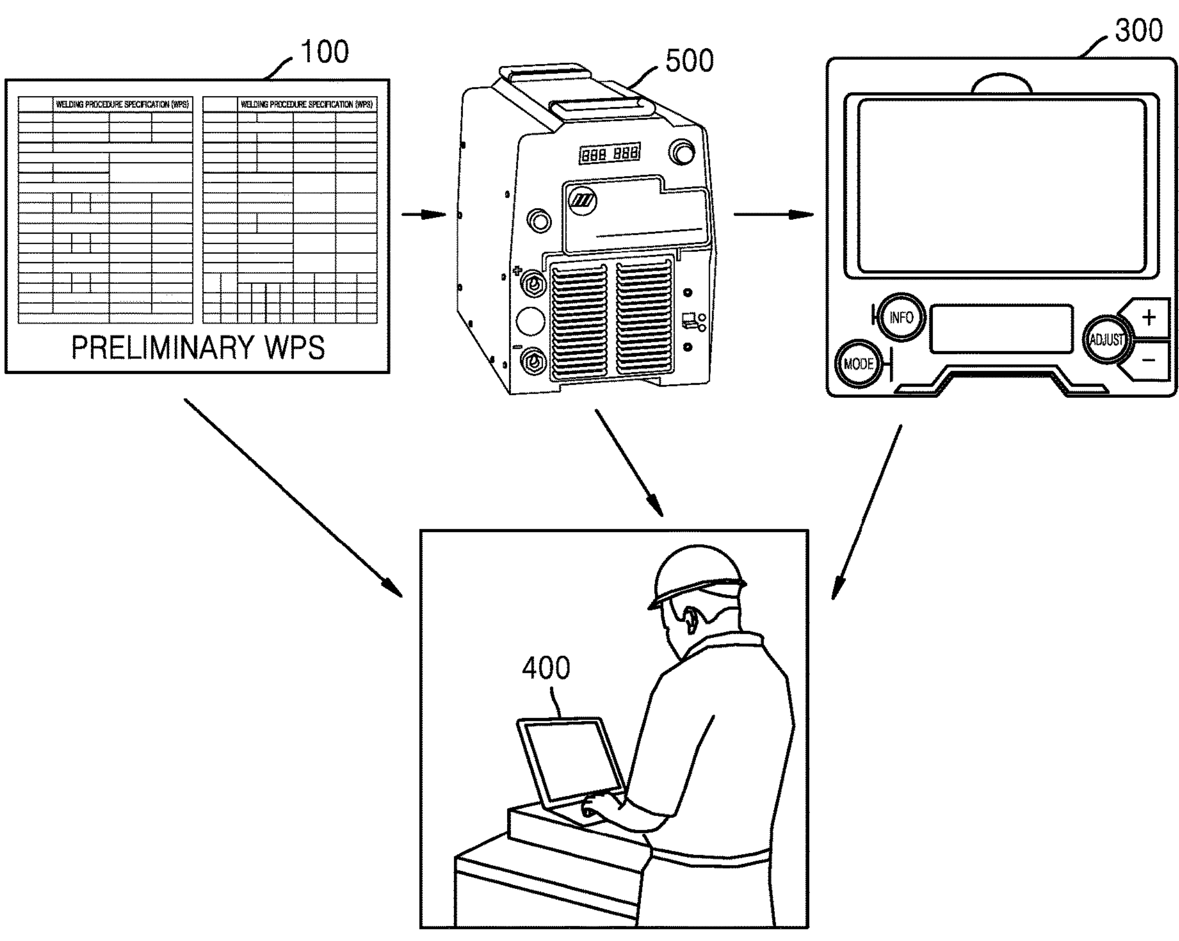
FIG. 6 is a diagram for schematically describing WPS inspection according to an embodiment.

FIG. 6 is a diagram for schematically describing WPS inspection according to an embodiment. Hereinafter, descriptions about details that overlap those of FIGS. 1 to 5 are omitted. Referring to FIG. 6, it is illustrated that the WPS generating apparatus 100 transmits the preliminary WPS to the welding protective equipment 300, the supervisor terminal 400, and the welding device 500, and the first supervisor who monitored a welding performance status by using the welding protective equipment 300 and the welding device 500 inputs the welding result monitoring information by using the supervisor terminal 400.

The welding result monitoring information generated by the first supervisor by using the supervisor terminal 400 may be transmitted to the WPS generating apparatus 100 through the network 600. The WPS generating apparatus 100 may transmit the welding result monitoring information received from the supervisor terminal 400 possessed by the first supervisor to the supervisor terminal 400 possessed by the second supervisor. Also, the WPS generating apparatus 100 may transmit the preliminary WPS to the supervisor terminal 400 possessed by the second supervisor. The second supervisor may generate the inspection result information for the preliminary WPS by inspecting the preliminary WPS, based on the welding result monitoring information. Here, the inspection result information for the preliminary WPS may include information about determining the approval of the preliminary WPS as the completed WPS or information about determining the disapproval of the preliminary WPS as the completed WPS. The supervisor terminal 400 possessed by the second supervisor may transmit the inspection result information for the preliminary WPS to the WPS generating apparatus 100.

Figure 7:
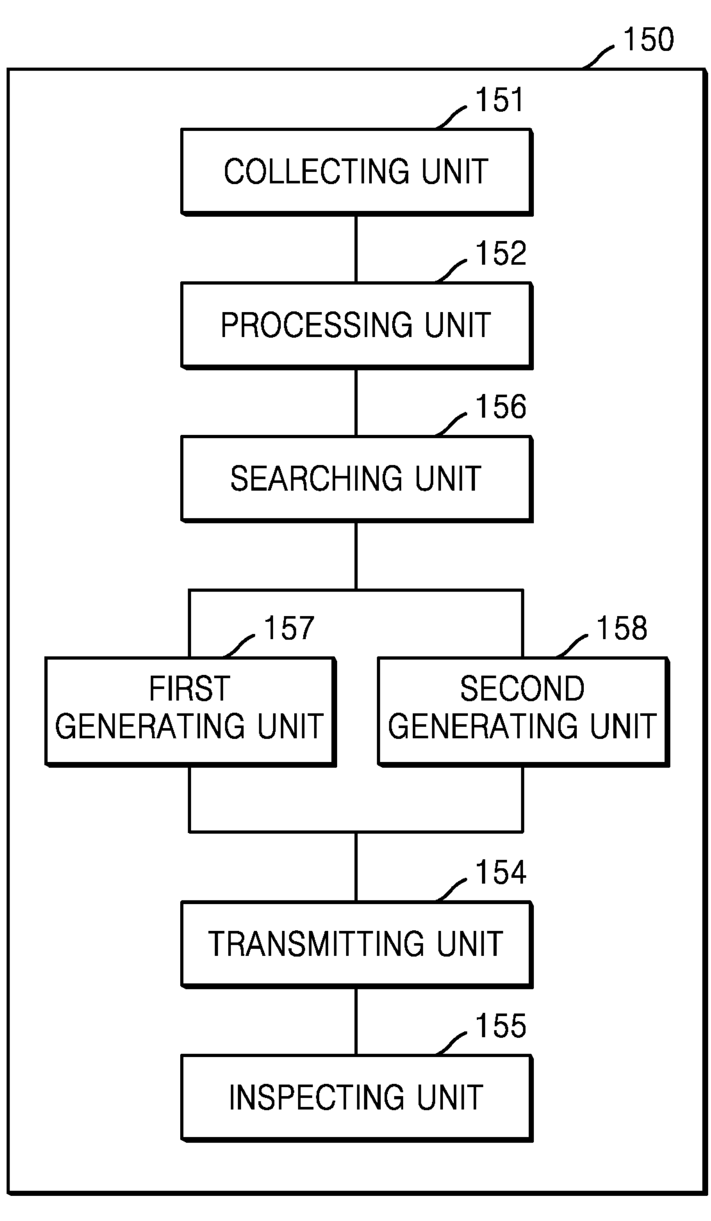
FIG. 7 is a block diagram for schematically describing a configuration of a WPS generation management unit according to another embodiment among the WPS generating apparatus of FIG. 3.

FIG. 7 is a block diagram for schematically describing a configuration of an information processing unit according to another embodiment among the WPS generating apparatus of FIG. 3. Hereinafter, descriptions about details that overlap those of FIGS. 1 to 6 are omitted. Referring to FIG. 7, the WPS generation management unit 150 may include the collecting unit 151, the processing unit 152, the inspecting unit 155, a searching unit 156, a first generating unit 157, and a second generating unit 158. Details about the collecting unit 151, the processing unit 152, the transmitting unit 154, and the inspecting unit 155 are the same as those described above in FIG. 5, and thus descriptions thereof are omitted.

The searching unit 156 may search the database 140 for one or more PQRs for WPS generation, based on the text welding-related information processed by the processing unit 152.

The searching unit 156 may search the database 140 by using the welding target and the thickness of the welding target as search words, among the text welding-related information, in order to search the database 140. In addition, the database 140 may be searched by using a welding process (type), a welding rod type, a preheat temperature, and a welding pose included in the welding-related information, as search words.

The searching unit 156 may provide one or more PQRs including the above search words as a first search result. Also, the searching unit 156 may provide information that there is no PQR including the above search words as a second search result.

The first generating unit 157 may generate the WPS by combining the one or more PQRs corresponding to the first search result of the searching unit 156, according to the WPS format.

FIG. 8 illustrates an example of a WPS generated by the first generating unit 157. Referring to FIG. 8, the WPS may include manufacturer-related variables (manufacturer identity verification and WPS verification), base material-related variables (base material identification (if possible, related standards are indicated as references) and material dimensions), and variables common to all welding procedures (a welding process, a joint shape, a welding pose, a joint groove process, a welding method, a back gouging method, a support, a filler metal name, filler metal dimensions, methods of handling a filler metal and flux, electrical parameters, mechanical welding, a preheat temperature, an interpass temperature, and post-weld heat treatment (PWHT). In addition, when an application code is ASME, welding variables of the WPS may include general welding details, welding process verification, welding performance verification, welding data, standard welding process specifications, brazing, and plastic fusing, and when the application code is AWS, the welding variables of the WPS may include a welding joint portion shape, welding pre-verification, manufacture, inspection, stud welding, and strengthening and repairing.

The second generating unit 158 may generate the WPS corresponding to the text welding-related information by using the machine learning model pre-trained to generate the WPS by using the text welding-related information, in response to the second search result of the searching unit 156. Here, the machine learning model may be a model trained through supervised learning using training data in which the text welding-related information is an input and the WPS corresponding to the text welding-related information is a label. Details about the generating of the WPS by using the AI algorithm are the same as those described above, and thus descriptions thereof are omitted. The WPS generated by the second generating unit 158 may be similar to or same as the WPS shown in FIG. 8.

The transmitting unit 154 may transmit the WPS response signal together with the WPS generated by the first generating unit 157 or the WPS generated by the second generating unit 158 to the user terminal 200 and/or the welding protective equipment 300 and/or the welding device 500, in response to the WPS transmission request signal.

Figure 9:
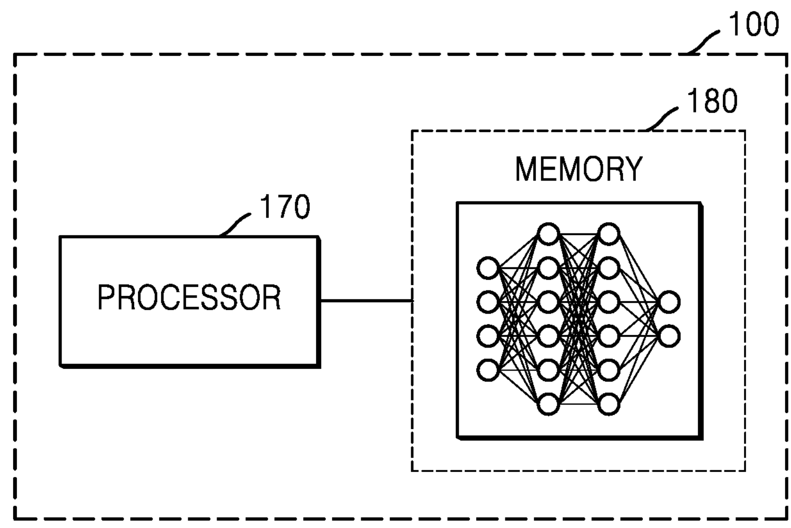
FIG. 9 is a diagram for schematically describing a configuration of a WPS generating apparatus, according to another embodiment.

FIG. 9 is a diagram for schematically describing a configuration of a WPS generating apparatus, according to another embodiment. Hereinafter, descriptions about details that overlap those of FIGS. 1 to 8 are omitted. Referring to FIG. 9, the WPS generating apparatus according to another embodiment may include a processor 170 and a memory 180.

In the present embodiment, the processor 170 may process functions performed by the communication unit 110, the storage medium 120, the program storage unit 130, the database 140, the WPS generation management unit 150, and the control unit 160 of FIG. 4, and the WPS generation management unit 150 including the collecting unit 151, the processing unit 152, the generating unit 153, the transmitting unit 154, the inspecting unit 155, the searching unit 156, the first generating unit 157, and the second generating unit 158 of FIGS. 5 and 7.

The processor 170 may control all operations of the WPS generating apparatus 100. Here, the processor may denote a hardware-embedded data processing device including a physically structured circuit to perform a function represented by an instruction or a code included in a program. Examples of the data processing device embedded in hardware may include processing devices, such as a microprocessor, a central processing unit (CPU), a processor core, a multiprocessor, an application-specific integrated circuit (ASIC), and a field programmable gate array (FPGA), but the scope of the present disclosure is not limited thereto.

The memory 180 may be operatively connected to the processor 170, and may store at least one code in association with an operation performed by the processor 170.

Also, the memory 180 may temporarily or permanently store data processed by the processor 170, and according to an embodiment, may store data stored in the database 140 of FIG. 4. Here, the memory 180 may include a magnetic storage medium or a flash storage medium, but the scope of the present disclosure is not limited thereto. The memory 180 may include an internal memory and/or an external memory, and may include a volatile memory, such as a dynamic random-access memory (DRAM), a static RAM (SRAM), or a synchronous DRAM (SDRAM), a non-volatile memory, such as a one-time programmable read-only memory (OTPROM), a programmable ROM (PROM), an erasable and programmable ROM (EPROM), an electrically EPROM (EEPROM), a mask ROM, a flash ROM, a NAND flash memory, or a NOR flash memory, a flash drive, such as a solid state drive (SSD), a compact flash (CF) card, a secure digital (SD) card, a micro-SD card, a mini-SD card, an extreme digital (XD) card, or a memory stick, or a storage medium, such as a hard disk drive (HDD).

Figure 10:
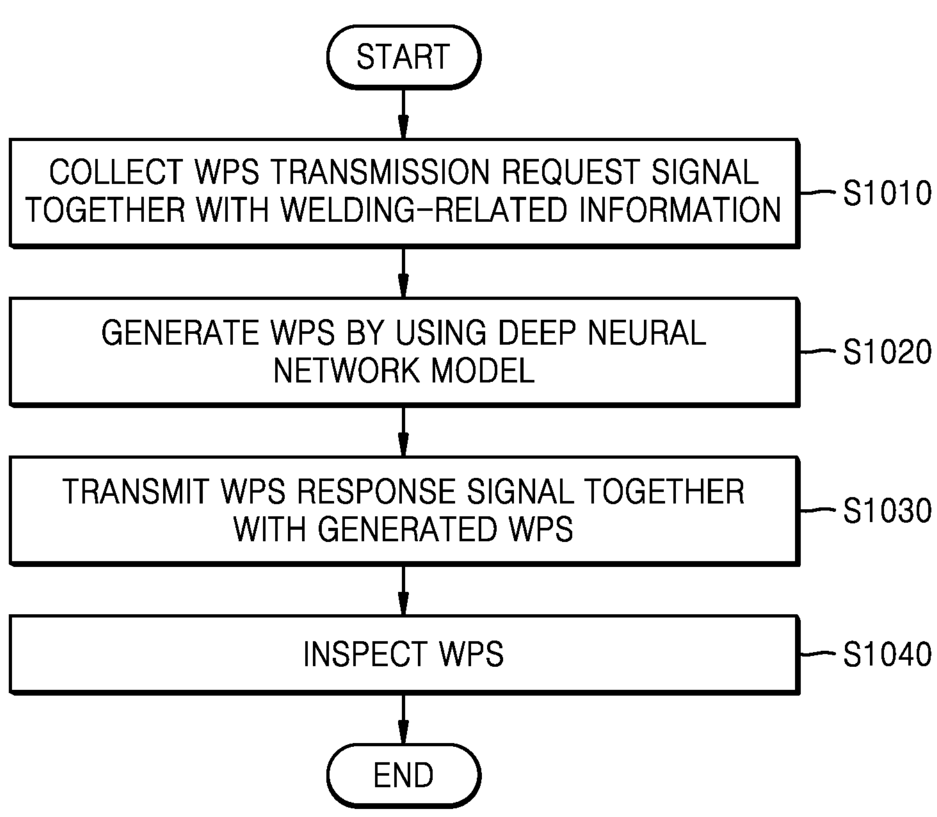
FIG. 10 is a flowchart for describing a method of automatically generating a WPS by using a machine learning algorithm, according to an embodiment.

FIG. 10 is a flowchart for describing a method of automatically generating a WPS by using a machine learning algorithm, according to an embodiment. Hereinafter, descriptions about details that overlap those of FIGS. 1 to 9 are omitted.

Referring to FIG. 10, in operation S1010, the WPS generating apparatus 100 may collect, from the user terminal 200 and/or welding protective equipment 300 and/or welding device 500, the WPS transmission request signal together with the welding-related information including the welding material for the welding target and the thickness of the welding material. In the present embodiment, the welding-related information collected by the WPS generating apparatus 100 from the user terminal 200 and/or the welding protective equipment 300 and/or the welding device 500 may include one or more of the text welding-related information, the speech welding-related information, and the image welding-related information. Also, the WPS generating apparatus 100 may convert the collected speech welding-related information and image welding-related information into the text welding-related information.

In operation S1020, the WPS generating apparatus 100 may generate the WPS by applying, to AI, the welding-related information collected from the user terminal 200 and/or the welding protective equipment 300 and/or the welding device 500. The WPS generating apparatus 100 may generate the WPS corresponding to the welding-related information by using the machine learning model pre-trained to generate the WPS by using the welding-related information. Here, the machine learning model may be a model trained through supervised learning using training data in which the welding-related information is an input and the WPS corresponding to the welding-related information is a label. The WPS generating apparatus 100 may train the machine learning model initially configured by using labeled training data, through supervised learning. Here, the initially configured machine learning model is an initial model designed to be configured as a model capable of generating the WPS, and parameter values are configured in arbitrary initial values. The initial model is trained through the above-described training data such that the parameter values are optimized, and thus, may be completed as a WPS generating model capable of accurately generating the WPS.

In operation S1030, the WPS generating apparatus 100 may transmit the WPS response signal together with the generated WPS to the user terminal 200 and/or the welding protective equipment 300 and/or the welding device 500, in response to the WPS transmission request signal.

In operation S1040, the WPS newly generated by using AI may be the preliminary WPS before completion, and the WPS generating apparatus 100 may transmit the preliminary WPS to the supervisor terminal 400 and the welding device 500 and receive, from the supervisor terminal 400, the inspection result information for the preliminary WPS, generated based on the welding result monitoring information. The WPS generating apparatus 100 may determine approval or disapproval of the preliminary WPS as the completed WPS, by using the inspection result information for the preliminary WPS, received from the supervisor terminal 400. When the approval of the preliminary WPS as the completed WPS is determined, the WPS generating apparatus 100 may store the completed WPS. When the disapproval of the preliminary WPS as the completed WPS is determined, the WPS generating apparatus 100 may revise or update the preliminary WPS, based on the welding result monitoring information, perform inspection on the revised or updated preliminary WPS, and repeat revision and inspection until the approval as the completed WPS is determined.

Figure 11:
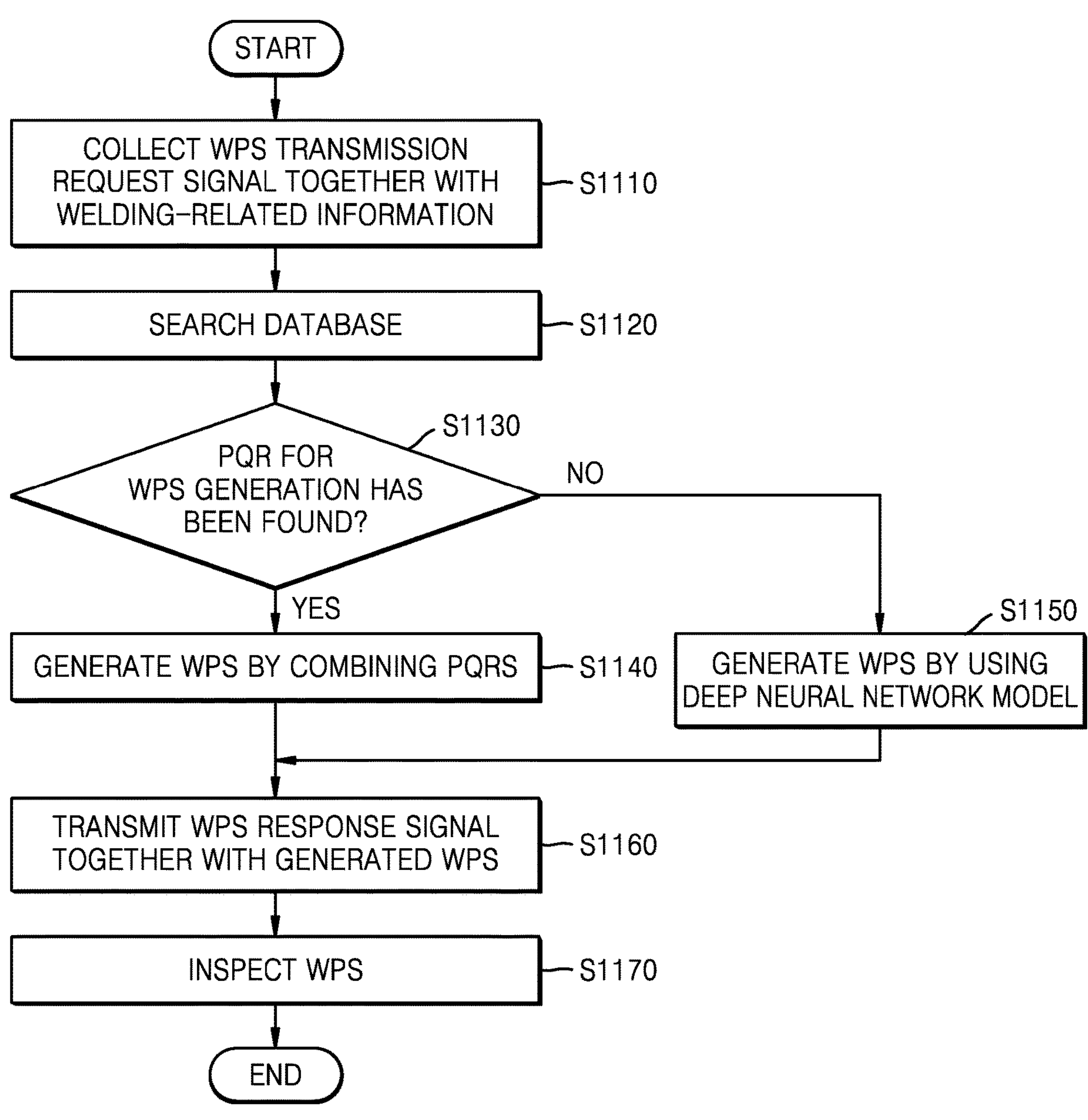
FIG. 11 is a flowchart for describing a method of automatically generating a WPS by using a machine learning algorithm, according to another embodiment.

FIG. 11 is a flowchart for describing a method of automatically generating a WPS by using a machine learning algorithm, according to another embodiment. Hereinafter, descriptions about details that overlap those of FIGS. 1 to 10 are omitted.

Referring to FIG. 11, in operation S1110, the WPS generating apparatus 100 may collect, from the user terminal 200 and/or welding protective equipment 300 and/or welding device 500, the WPS transmission request signal together with the welding-related information including the welding material for the welding target and the thickness of the welding material. In the present embodiment, the welding-related information collected by the WPS generating apparatus 100 from the user terminal 200 and/or the welding protective equipment 300 and/or the welding device 500 may include one or more of the text welding-related information, the speech welding-related information, and the image welding-related information. Also, the WPS generating apparatus 100 may convert the collected speech welding-related information and image welding-related information into the text welding-related information.

In operation S1120, the WPS generating apparatus 100 may search the database 140, based on the text welding-related information. The WPS generating apparatus 100 may search the database 140 by using the welding target and the thickness of the welding target as search words, among the text welding-related information, in order to search the database 140. In addition, the database 140 may be searched by using a welding process (type), a welding rod type, a preheat temperature, and a welding pose included in the welding-related information, as search words.

The WPS generating apparatus 100 may provide one or more PQRs including the above search words as the first search result. Also, the WPS generating apparatus 100 may provide information that there is no PQR including the above search words as the second search result.

In operation S1130, the WPS generating apparatus 100 may determine whether a PQR for WPS generation has been found. In other words, the WPS generating apparatus 100 may determine whether the first search result has been received.

In operation S1140, when a PQR for WPS generation has been found, the WPS generating apparatus 100 may generate the WPS by combining one or more PQRs corresponding to the first search result according to the WPS format.

In operation S1150, when a PQR for WPS generation is not found, the WPS generating apparatus 100 may generate the WPS corresponding to the text welding-related information by using the machine learning model pre-trained to generate the WPS by using the text welding-related information.

In operation S1160, the WPS generation management unit 150 may transmit, to the user terminal 200 and/or the welding protective equipment 300 and/or the welding device 500, the WPS response signal together with the WPS generated by the first generating unit 157 or the WPS generated by the second generating unit 158, in response to the WPS transmission request signal.

In operation S1170, the WPS generating apparatus 100 may transmit, to the user terminal 200 and/or the welding protective equipment 300 and/or the welding device 500, the WPS response signal together with the WPS generated by combining the one or more PQRs according to the WPS format or the WPS generated by using the AI algorithm, in response to the WPS transmission request signal.

In operation S1180, the WPS newly generated by using AI may be the preliminary WPS before completion, and the WPS generating apparatus 100 may transmit the preliminary WPS to the supervisor terminal 400 and the welding device 500, and receive, from the supervisor terminal 400, the inspection result information for the preliminary WPS to perform inspection on the preliminary WPS.

The embodiments according to the present disclosure described above may be implemented in the form of a computer program executable by various components on a computer, and such a computer program may be recorded on a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the present disclosure or well known to one of ordinary skill in the computer software field. Examples of the computer program include not only machine codes generated by a compiler, but also high-level language codes executable by a computer by using an interpreter or the like.

The term "the" and similar referential terms in the specification (specifically in the claims) of the present disclosure may be used for both the singular and the plural. Further, when a range is described in the present disclosure, the present disclosure includes inventions to which individual values belonging to the range are applied (unless otherwise stated), and it is considered that each individual value configuring the range is described in the detailed description of the present disclosure.

Unless an order is clearly stated or unless otherwise stated, operations configuring a method according to the present disclosure may be performed in an appropriate order. the present disclosure is not necessarily limited by an order the operations are described. In the present disclosure, the use of all examples or exemplary terms (for example, "etc.") is merely for describing the present disclosure in detail and the scope of the present disclosure is not limited by those examples or exemplary terms unless defined in the claims. Also, it would be obvious to one of ordinary skill in the art that various modifications, combinations, and changes may be configured according to design conditions and factors within the scope of claims or equivalents.

Therefore, the scope of the present disclosure should not be determined limitedly based on the above-described embodiments, and not only the appended claims but also all ranges equivalent to or equivalently changed from the claims are within the scope of the present disclosure.

EXPLANATION OF REFERENCE NUMERALS DESIGNATING THE MAJOR ELEMENTS OF THE DRAWINGS

100: WPS generating apparatus
200: User terminal
300: Welding protective equipment
400: Supervisor terminal
500: Welding device
600: Network

The invention claimed is:

1. A method, performed by a processor of a welding procedure specification (WPS) generating apparatus, of automatically generating a WPS by using a machine learning algorithm, the method comprising:

collecting a WPS transmission request signal together with welding-related information comprising a welding material for a welding target and a thickness of the welding material;

generating a WPS corresponding to the welding-related information by using a machine learning model pre-trained to generate the WPS by using the welding-related information; and transmitting a WPS response signal together with the generated WPS, in response to the WPS transmission request signal, wherein the machine learning model is a model trained through supervised learning using training data in which the welding-related information is an input and the WPS corresponding to the welding-related information is a label, wherein the WPS comprises a preliminary WPS before completion, and the method further comprises, before the transmitting of the WPS response signal, transmitting the preliminary WPS to one or more of a supervisor terminal possessed by a first supervisor, a supervisor terminal possessed by a second supervisor, and a welding device, and where the method further comprises:

receiving welding result monitoring information for the welding device, generated based on the preliminary WPS, from the supervisor terminal possessed by the first supervisor;

receiving inspection result information for the preliminary WPS, generated based on the welding result monitoring information, from the supervisor terminal possessed by the second supervisor; and determining approval or disapproval of the preliminary WPS as a completed WPS, based on the inspection result information for the preliminary WPS.

2. The method of claim 1, wherein the collecting of the WPS transmission request signal comprises collecting the WPS transmission request signal together with the welding-related information comprising one or more of text, a speech, and an image.

3. The method of claim 2, wherein the collecting of the WPS transmission request signal comprises collecting the WPS transmission request signal together with the welding-related information from one or more of a welding machine, a welding protective equipment, and a user terminal.

4. A non-transitory computer-readable recording medium having stored therein a computer program for executing, by using a computer, a method comprising:

collecting a WPS transmission request signal together with welding-related information comprising a welding material for a welding target and a thickness of the welding material;

generating a WPS corresponding to the welding-related information by using a machine learning model pre-trained to generate the WPS by using the welding-related information; and transmitting a WPS response signal together with the generated WPS, in response to the WPS transmission request signal, wherein the machine learning model is a model trained through supervised learning using training data in which the welding-related information is an input and the WPS corresponding to the welding-related information is a label, wherein the WPS comprises a preliminary WPS before completion, and the method further comprises, before the transmitting of the WPS response signal, transmitting the preliminary WPS to one or more of a supervisor terminal possessed by a first supervisor, a supervisor terminal possessed by a second supervisor, and a welding device, and where the method further comprises:

receiving welding result monitoring information for the welding device, generated based on the preliminary WPS, from the supervisor terminal possessed by the first supervisor;

receiving inspection result information for the preliminary WPS, generated based on the welding result monitoring information, from the supervisor terminal possessed by the second supervisor; and determining approval or disapproval of the preliminary WPS as a completed WPS, based on the inspection result information for the preliminary WPS.

5. An apparatus for automatically generating a welding procedure specification (WPS) by using a machine learning algorithm, the apparatus comprising:

a processor; and a memory operatively connected to the processor and storing at least one code performed by the processor, wherein the memory stores codes that cause, when executed through the processor, the processor to:

collect a WPS transmission request signal together with welding-related information comprising a welding material for a welding target and a thickness of the welding material;

generate a WPS corresponding to the welding-related information by using a machine learning model pre-trained to generate the WPS by using the welding-related information; and transmit a WPS response signal together with the generated WPS, in response to the WPS transmission request signal, wherein the machine learning model is a model trained through supervised learning using training data in which the welding-related information is an input and the WPS corresponding to the welding-related information is a label, wherein the memory further stores codes that cause the processor to, when the WPS comprises a preliminary WPS before completion, transmit the preliminary WPS to one or more of a supervisor terminal possessed by a first supervisor, a supervisor terminal possessed by a second supervisor, and a welding device, before transmitting the WPS response signal, and wherein the memory further stores codes that cause the processor to:

receive welding result monitoring information for the welding device, generated based on the preliminary WPS, from the supervisor terminal possessed by the first supervisor;

receive inspection result information for the preliminary WPS, generated based on the welding result monitoring information, from the supervisor terminal possessed by the second supervisor; and determine approval or disapproval of the preliminary WPS as a completed WPS, based on the inspection result information for the preliminary WPS.

6. The apparatus of claim 5, wherein the memory further stores codes that cause the processor to collect the WPS transmission request signal together with the welding-related information comprising one or more of text, a speech, and an image, while collecting the WPS transmission request signal.

7. The apparatus of claim 6, wherein the memory further stores codes that cause the processor to collect the WPS transmission request signal together with the welding-related information from one or more of a welding machine, welding protective equipment, and a user terminal, while collecting the WPS transmission request signal.

* * * * *